Jan. 14, 1936.  E. G. JURGENS ET AL  2,027,434
BAG MAKING AND FILLING MACHINE
Filed March 24, 1933   11 Sheets-Sheet 2

Jan. 14, 1936.   E. G. JURGENS ET AL   2,027,434
BAG MAKING AND FILLING MACHINE
Filed March 24, 1933    11 Sheets-Sheet 10

Inventors
Emil G. Jurgens
and Hazen K. Becher
By Rummler, Rummler & Woodworth Attys Patented Jan. 14, 1936

2,027,434

UNITED STATES PATENT OFFICE 2,027,434

BAG MAKING AND FILLING MACHINE

Emil G. Jurgens and Hazen K. Becker, Chicago, Ill., assignors to Peters Machinery Co., Chicago, Ill., a corporation of Illinois Application March 24, 1933, Serial No. 662,506

5 Claims. (Cl. 93—5)

This invention relates to machines for forming, filling, and sealing paper bags.

A purpose of the invention is to provide improvements in such machines wherein substantially all operations are performed during travel of the hollow dies around which the bags are formed and held during the filling operation. The dies around which the bags are formed are in a series carried by a chain belt, this belt being intermittently driven in one direction. Coacting mechanisms are provided which serve to sever the bag material from a roll, form it around the dies, make seams along the sides of the bags, then fill the bags and remove them from the dies, close their open ends by twisting the necks of the bags, and apply sealing tape to the twisted necks of the bags.

An object of the invention is to provide a machine of this character in which the principal operating elements thereof move continuously or intermittently in one direction during the forming, filling and closing operations, permitting a smoother and more rapid operation than is generally possible in machines of this class in which the forming elements are reciprocated during the forming operation.

Further objects of the invention are to provide improvements in the various mechanisms coacting with the moving, forming elements and improvements in the means for twisting the open ends of the bags and sealing the twisted ends thereof.

These objects are accomplished by means of a construction as illustrated in the drawings, in which:—

This bag forming, filling and closing machine is equipped with a series of hollow forms or dies around which the paper for making the bags is automatically wrapped while the dies are intermittently moved in a continuous path in succession from station-to-station where the paper is cut from rolls, adhesive applied thereto, folded around the dies, engaged with heating irons where the adhesive is dried, and brought into position for receiving a measured charge of filling material through the hollow dies. In the final position of the dies, the bags are removed with the filling material therein.

The filled bags are next moved into cooperative relation with a bag-neck-twisting mechanism. The final operation of the machine on a filled bag consists in applying adhesive tape to the twisted neck thereof.

In order to drive the various operating mechanisms of the machine, the frame structure 1 supports a motor 2 which, through gearing 3, rotates the main drive shaft 4.

For the purpose of intermittently moving a chain belt construction 5 which carries a series of forming dies 6, the drive shaft 4 has a crank 7 which is connected by a link 8 with an arm 9 pivoted on shaft 10. This shaft carries fast a ratchet wheel 11 which is intermittently driven by an oscillating pawl 12 on the end of arm 9. Shaft 10, through the gearing 13, drives shaft 14 which carries a pair of driving sprockets 15 for the chains 5.

Each die 6 is a hollow rectangular tube rigid with a transversely extending bar 16 which carries rollers 17 at its ends fitting between horizontal rails 18 and 19, carried by the frame structure 1. The bar 16 at its ends is rigid with links of the chain belt 5. The rollers 17, being spaced apart between the rails, support the dies 6 firmly in horizontal position as they travel from the front of the machine toward the delivery end thereof.

The dies supporting chain belt travels intermittently in the direction indicated by the arrow (Fig. 1) and at times when the chain remains stationary, upon the reverse stroke of the feeding pawl 12, paper is fed downwardly in position to be engaged by a die upon the succeeding motion of the chain.

Figure 4:
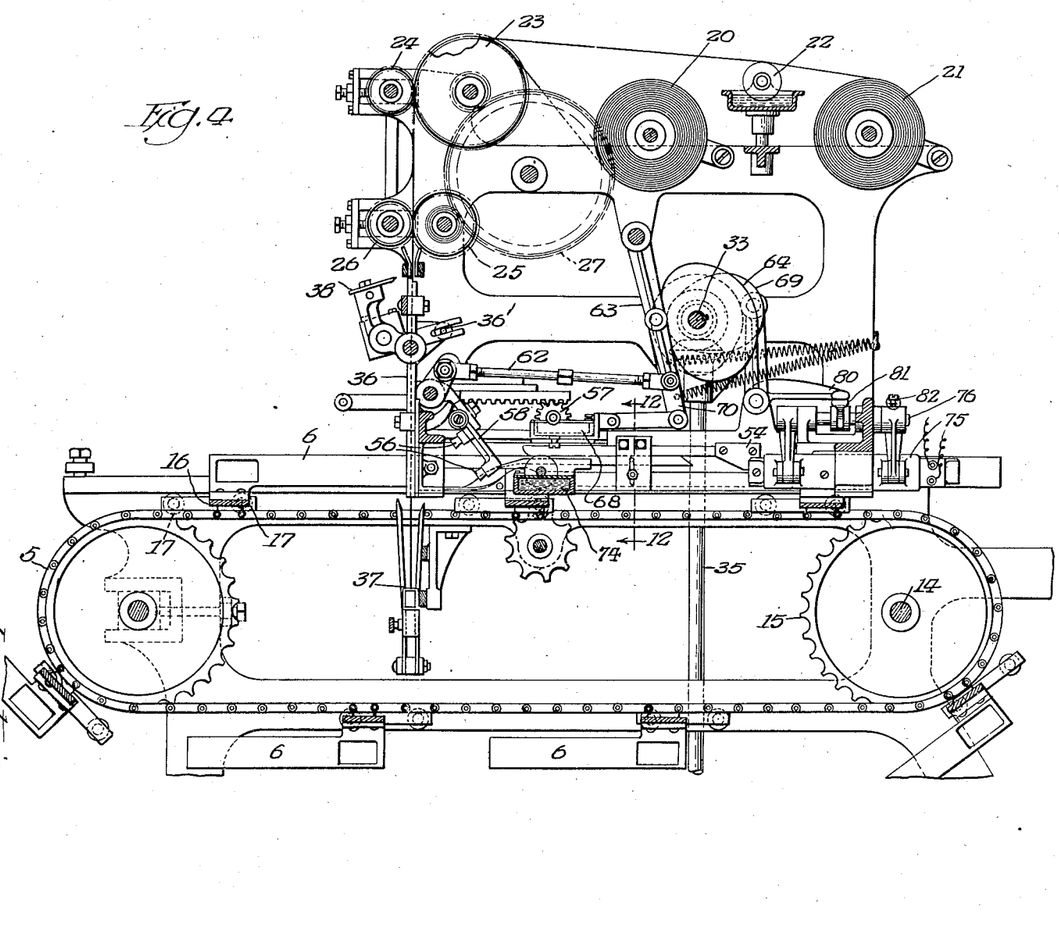
Figs. 4 and 5 show the machine in longitudinal sectional elevation.

The paper feeding mechanism is illustrated in Figure 4 and the object thereof is to sever a length of paper from a strip as required for forming one bag, and to place this cut portion of paper in front of a die so that as the die advances, the paper may be wrapped around it in the form of a bag which is closed at the advancing end of the die and open at the following or charge-receiving end of the die. The paper is supplied from rolls 20 and 21, the roll 20 being used alone when it is desired to make bags of single thickness and both rolls being employed when double-walled bags are manufactured. When double-walled bags are made, the strip of paper from roll 21 receives a line coating of liquid adhesive from an idler roller 22.

The paper passes between feed rollers arranged in pairs 23—24 and 25—26. The rollers 23 and 25 are driven by gear 27. The gear 27 is intermittently operated by ratchet 28 (Fig. 1) which is driven by oscillating pawl 29 on arm 30 which in turn is oscillated by link 31 connected with crank 32 on the transverse shaft 33. The latter is continuously rotated by bevel gearing 34 driven by the vertical shaft 35 which, at its lower end, is connected by bevel gearing with the main drive shaft 4. Link 31 has an adjustable connection with the oscillating pawl carrying arm 30 so that the feed of the paper may be varied according to the length of the bags which it is desired to form.

The paper, upon leaving the pair of feed rollers 25 and 26 (Fig. 4) passes along the vertical guide channels 36 which guide it in front of one of the hollow, forming dies 6 and the lower edge of the advancing strip of paper rests upon an adjustable gauge 37 after the strip is severed by knife 38.

Knife 38 is operated by a cam 39 (Fig. 1) fast to shaft 33, through arm 40 which is connected by link 41 to an arm 42 extending downwardly from the knife supporting shaft. The guide channel frame 36 (Fig. 4) is connected with the knife arm at 36' to shift down clear of the knife when the paper is cut.

A pawl 43 (Fig. 1) on the end of arm 42 serves to oscillate a spring 44 which assists in feeding the severed portion of paper downwardly as the paper drops by its own weight.

Figures 7, 8, 9:
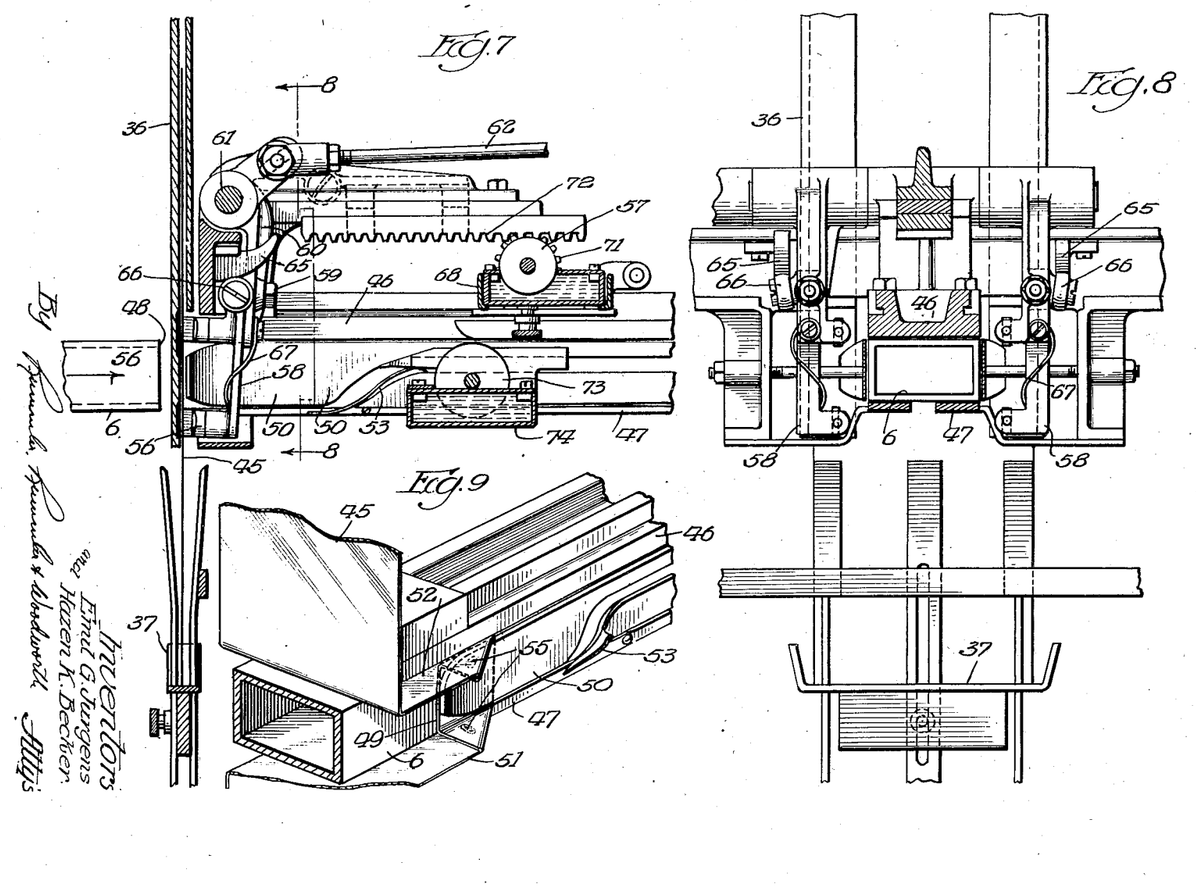
Fig. 7 is a longitudinal sectional detail in elevation illustrating adhesive applying means.
Fig. 8 is a sectional view taken on the line 8—8 of Fig. 7.
Fig. 9 is a detail in perspective showing paper folding mechanism.

Figure 7 shows a severed portion of paper 45 in position for engagement by a hollow, forming die 6. As this die moves forward, as indicated by the arrow in this figure, the paper is folded downwardly on the top of the die and upwardly over the bottom of the die as it is pushed along between the fixed, folding elements 46 and 47. The central portion of the paper, engaging end 48 of the die, forms the bottom of the bag.

Figures 1, 25:
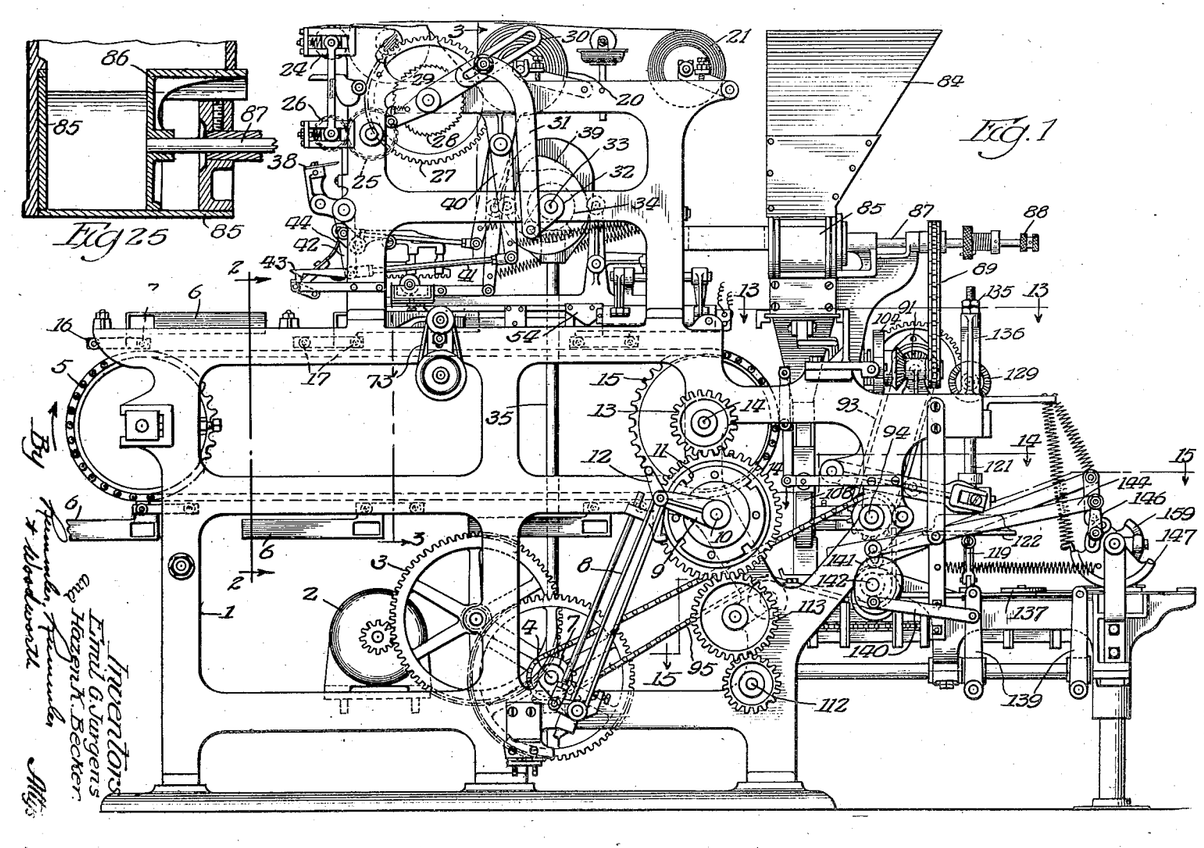
Figure 1 shows the machine in side elevation.
Fig. 25 is a longitudinal sectional detail of the charge-measuring mechanism.
Figure 10:
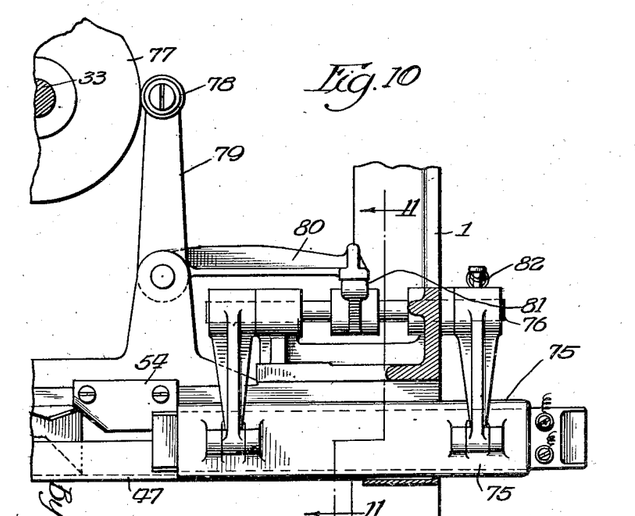
Fig. 10 is a fragmentary detail in side elevation showing the arrangement of an electric heater for drying adhesive applied to the side folds of a bag.

The narrow sides of the bag are formed by first making the fold 49 (Fig. 9) on the portion of the paper engaging the stationary spring folding elements 50. The sides of the bag are completed by next folding the part of the paper indicated at 51 (Fig. 9) upwardly and the part indicated at 52 downwardly (see Fig. 10a). The bottom fold is made by the guide 53 (Fig. 9) and the top fold is made by the curved guide 54 (Figs. 1 and 10). But prior to any of these folding operations, spots 55 of adhesive are applied to the cut portion of paper 45, when still in its vertical position, (Figs. 4 and 7) by means of daubers 56 which receive the adhesive from rollers 57. These daubers are carried by an arm 58 which is pivoted at 59 to an arm 60 fast on shaft 61 which is oscillated by means of rod 62, connected with a pivoted arm 63 (Fig. 4) which is actuated by cam 64 on shaft 33.

The purpose of pivot 59 (Fig. 7) is to provide means for permitting the daubers to come into vertical alinement by action of a stationary cam 65 on roller 66, carried by arm 58.

Figure 3:
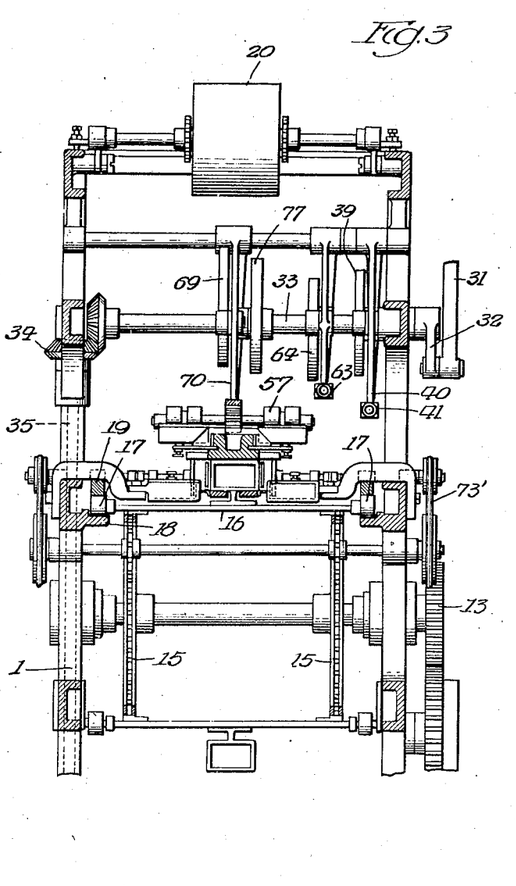
Fig. 3 is a transverse sectional elevation taken on the line 3—3 of Fig. 1.

On the return stroke of the daubing mechanism, spring 67 swings the daubing arm into such position that the daubers 56 will be engaged by adhesive supply rollers 57. The adhesive container 68 which carries these rollers is reciprocated beneath the daubers by means of a cam 69 (Fig. 3) on shaft 33. This cam acts upon a roller on the pivot arm 70 which is linked to the reciprocating adhesive container 68.

The adhesive feed rollers 57 which pass beneath the daubers 56 when the latter are in their upper position are rotated by the pinion 71 thereon engaging fixed rack 72 (Fig. 7).

Again referring to Figure 10a, the portions 52, of the side walls of the bags which are folded down over the portions 51, receive a band of adhesive on their under sides, prior to the downward folding thereof, as these side wall portions of the bag pass over adhesive applying rollers 73 (Fig. 7). Rollers 73 are rotated by belt connection 73' (Fig. 3) and lift the adhesive from the supply container 74.

Figure 11:
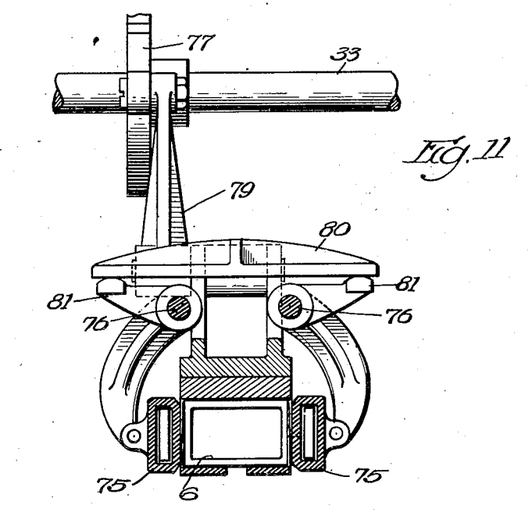
Fig. 11 is a sectional detail taken on the line 11—11 of Fig. 10.
Figure 12:
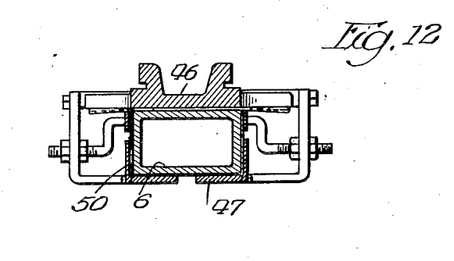
Fig. 12 is a sectional detail taken on the line 12—12 of Fig. 4.

After the side wall portions 52 of the bags have been pressed against the portions 51, the adhesive thereon is promptly dried by the application of electric heating irons 75 which are illustrated in detail by Figures 10 and 11. These irons are oscillated with their supporting shafts 76 by means of cam 77 on the transverse shaft 33. The cam acts upon a roller 78 carried by bell crank 79. The horizontal arm 80 of bell crank 79 is widened out suitably for engaging arms 81 on each of the shafts 76. The electric heaters 75 are normally held out of engaging position by restoring spring 82.

Figure 5:
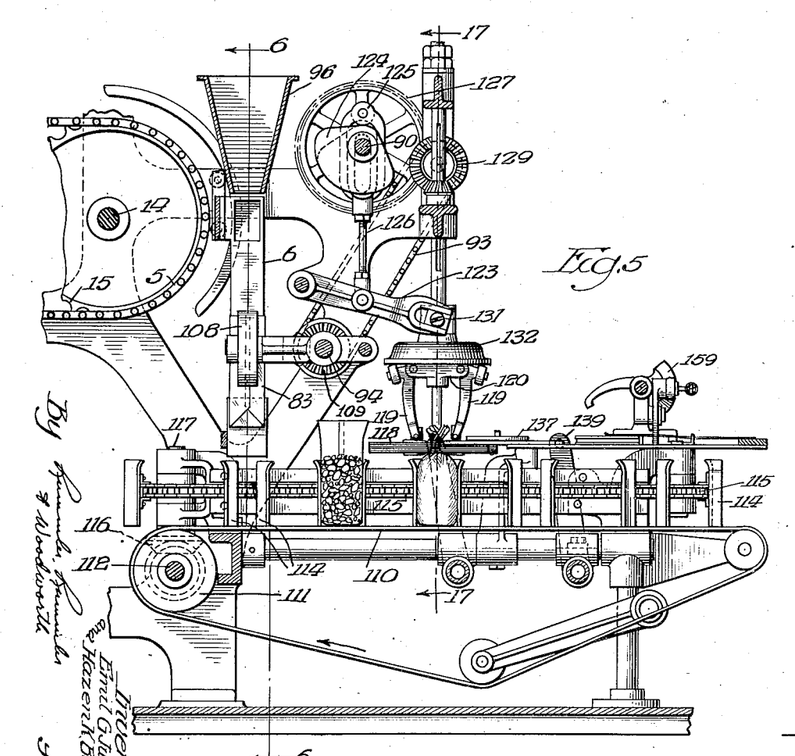
Figure 6:
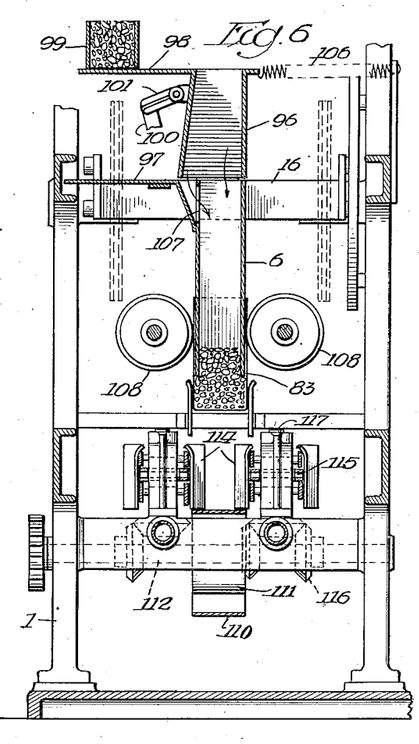
Fig. 6 is a transverse sectional elevation taken on the line 6—6 of Fig. 5.

Bags are completed but empty when they leave the position of the electric heaters, but then the supporting chains 5 for the series of dies 6 carry the dies around the sprockets 15 bringing them, in succession, into vertical position, the bottom of each bag being at the bottom of its forming die, each of which is a rectangular tube and receives a measured charge of filling material through its upper open end when at rest in the position indicated by Figures 5 and 6. A completed bag is indicated in these figures by the numeral 83.

The material which is packed in bags by means of this machine is supplied to the hopper 84 at the bottom of which is a rotating measuring device 85 (Figs. 1 and 25). This measuring device is a semi-cylindrical hollow member carried by shaft 87 and has an adjustable insert 86 which may be shifted by means of the knurled head 88, to regulate the quantity of material received upon each rotation of shaft 87. This is illustrated by Figure 25. The shaft is driven by a chain 89 which connects it with shaft 90 (Fig. 13), which in turn is driven through bevel gearing 91 by shaft 92, the latter being connected by chain 93 with a transverse shaft 94 (Fig. 1). The shaft 94 is driven by a chain 95 connecting it with the main drive shaft 4.

Upon each rotation of the measuring device 85, its charge is dropped into a laterally reciprocating delivery spout 96 which delivers the charge of material to the hollow die 6 which carries the bag to be filled, as illustrated by Figure 6. The delivery spout 96 slides over a horizontal table 97 and carries a flange 98 for closing at this time the bottom end of an intermediate, stationary spout 99.

Figure 13:
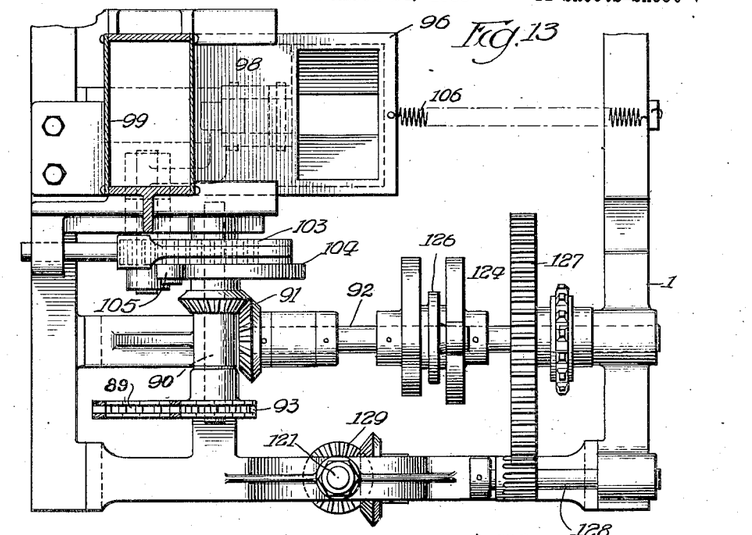
Fig. 13 is a detail in plan and partly in section taken on the line 13—13 of Fig. 1.
Figure 16:
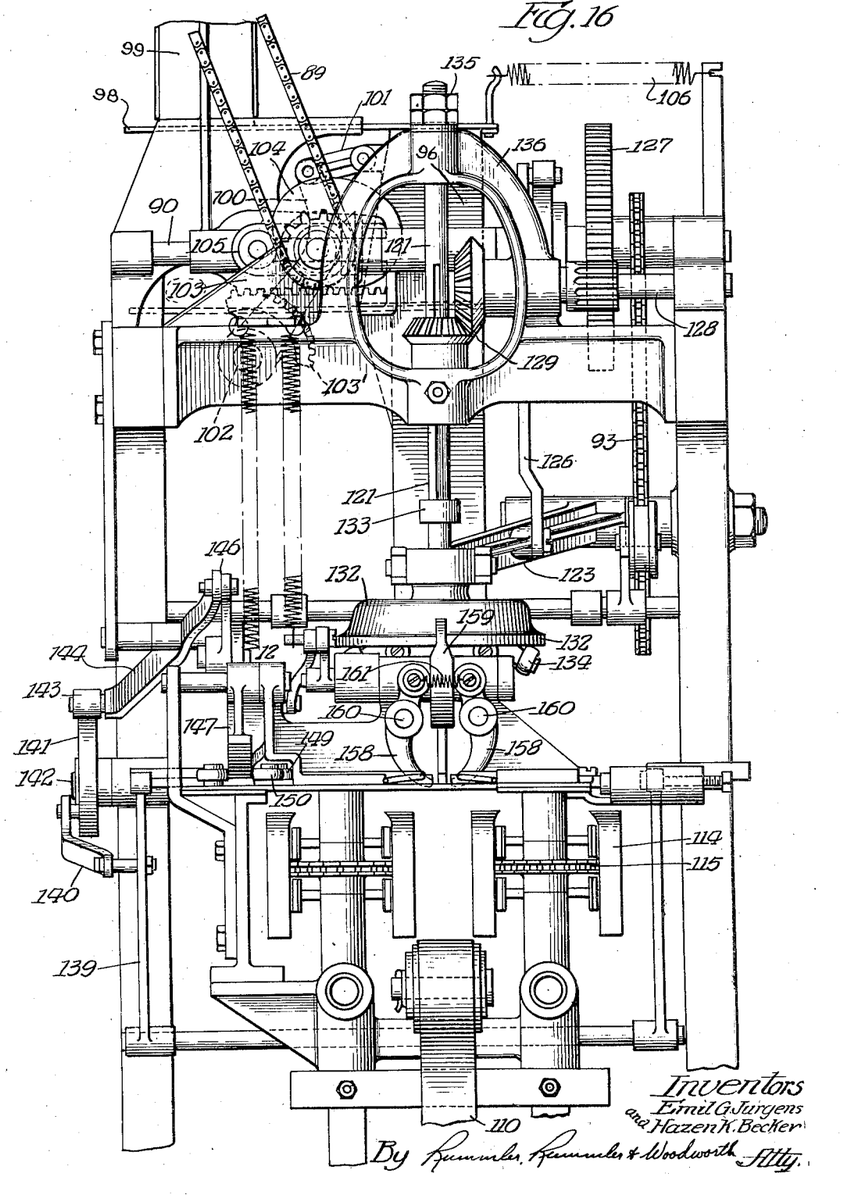
Fig. 16 is a fragmentary elevation of the delivery end of the machine.

The mechanism for laterally reciprocating delivery spout 96 is illustrated by Figures 13 and 16 and comprises an oscillating arm 100. The arm 100 is connected with the sliding spout 96 by a link 101 and is operated by its oscillating carrying shaft 102. The latter receives motion from a rack 103 meshing with a segment gear 103' fast to the shaft. Rack 103 is reciprocated by cam 104 (Fig. 13) on the driven shaft 90. This cam engages a roller 105 carried by the rack and serves to shift the rack and mechanism operated thereby in the direction necessary to carry spout 96 beneath spout 99 (Fig. 6). Spring 106 serves to move the spout 96 in the opposite direction when permitted by the cam.

The hollow dies 6 are filled both through the opening in the end thereof and through a side opening 107, which aids in speeding up the filling operation while the spout is under motion in both its forward and return strokes.

Figure 14:
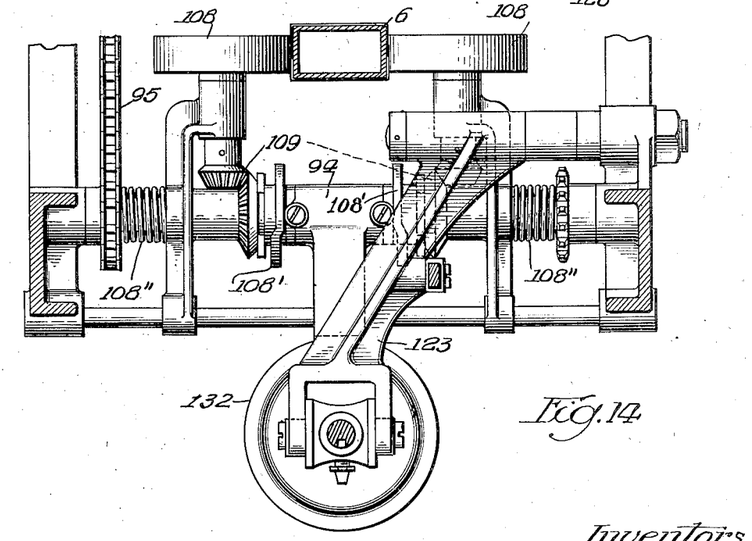
Fig. 14 is a detail in plan and partly in section taken on the line 14—14 of Fig. 1.

The material received by the dies drops to the bottom thereof which is also open but closed at this time by the bag which has been formed over the die. The filled bag is stripped from the die both by the weight of the material therein and by the action of feeding rollers 108. Rollers 108 are driven from shaft 94 by means of the bevel gearing 109, as shown by Figure 14, and are shifted out of operative position by cams 108' operating against stationary rollers and against the returning springs 108".

After the filling operation, the bags rest upon a belt 110 (Fig. 5) which is driven by a roller 111 on transverse shaft 112 which, through the gearing 113 (Fig. 1), receives motion from the intermittently rotating shaft 10.

Figure 15:
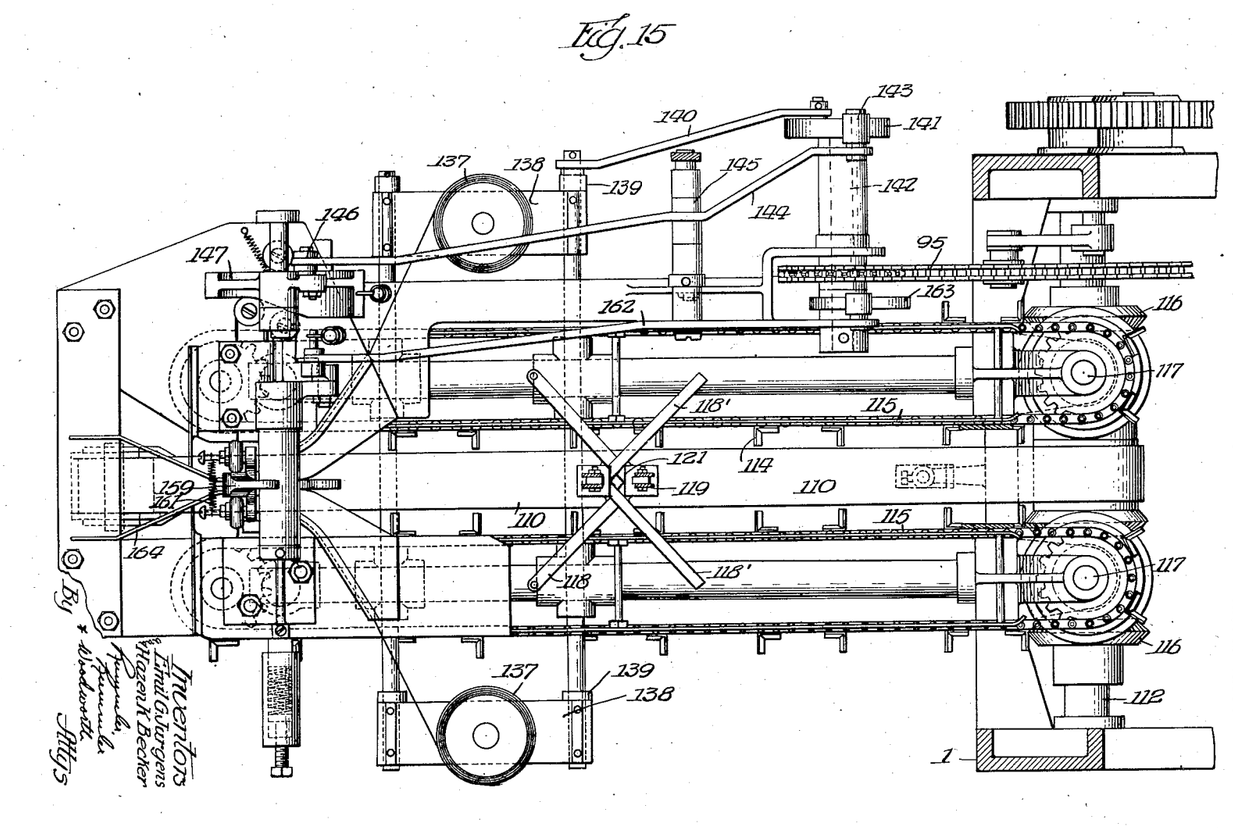
Fig. 15 is a plan view of the delivery end of the machine and partly in section as indicated by the line 15—15 of Fig. 1.

Receiving pockets for the filled bags are formed by the vertical flanges 114 (Fig. 5) carried by chains 115. These chains are driven from shaft 112 by bevel gearing 116, connecting shaft 112 with the vertical sprocket shafts 117 (Fig. 15).

The filled bags are carried along by the pocket-forming flanges 114 and the belt 110 to bag-neck-twisting mechanism which is illustrated by Fig. 5 and Figures 14 to 20 inclusive.

Figures 17, 18, 19, 20:
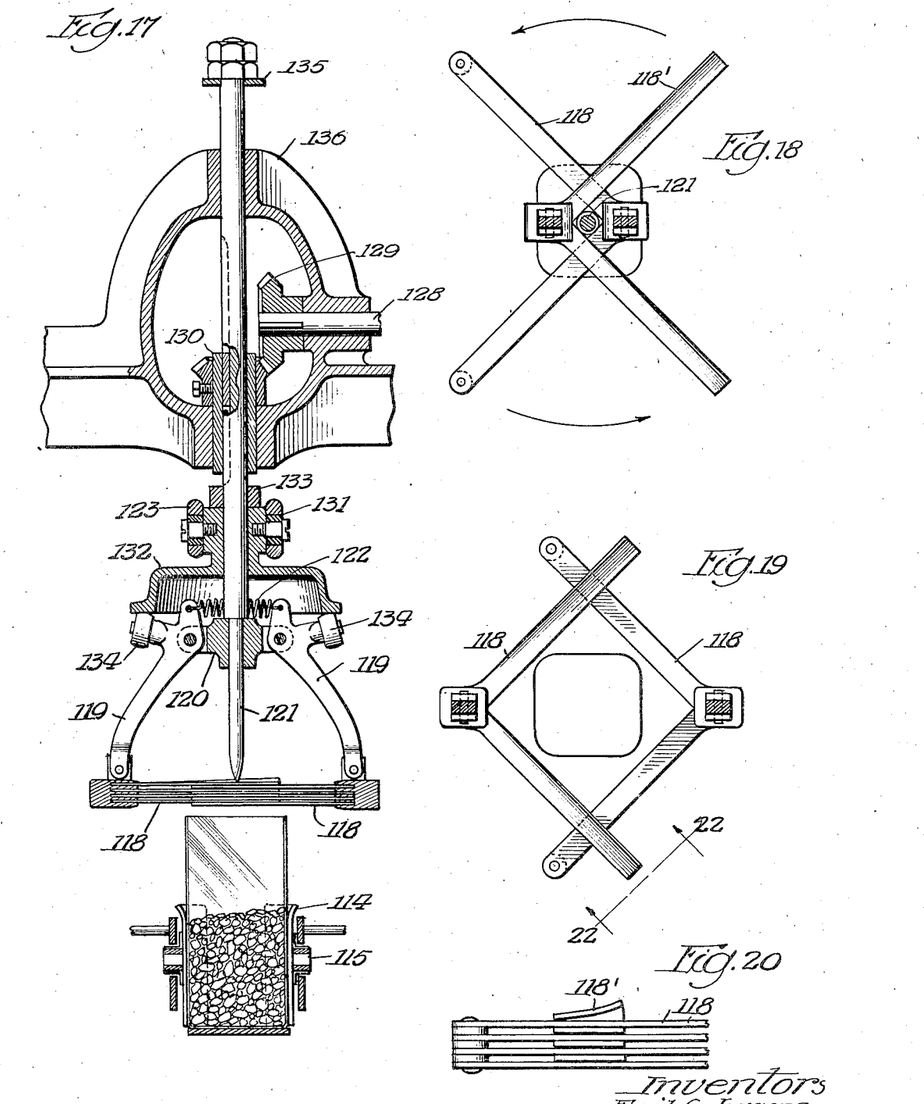
Fig. 17 is a sectional detail taken on the line 17—17 of Fig. 5 and shows the bag-neck-twisting mechanism in open position.
Fig. 18 is a detail in plan of the twisting elements as they appear in closed and twisting relation.
Fig. 19 is a detail in plan of the twisting elements shown in open position.
Fig. 20 is a fragmentary detail side view of the twisting elements as indicated by the line 20—20 of Fig. 19.

The bag twisting means consists mainly in overlapping pairs of laminated V-shaped bag-neck engaging members 118 which are carried at the bottom of bell crank arms 119 pivoted to ears on a collar 120 fast to a rotating spindle 121 (Fig. 17 which shows the twisting elements 118 in open condition so that they may be passed downwardly over the neck of a filled bag). A spring 122, acting between the bell cranks 119, serves to normally hold the twisting elements in open condition. The latter by being interleaved afford wide bearing on opposite sides of the neck of a bag without shearing and serve to support each other for relative horizontal motion. The spindle 121 is reciprocated vertically while it rotates by a forked arm 123, receiving oscillation from a cam 124 (Fig. 5) operating upon a roller 125 carried by pitman 126 which at its lower end is pivoted to arm 123. The cam 124 is supported by the driven shaft 90 and the latter, by gearing 127, drives a shaft 128 which through bevel gearing 129 rotates spindle 121. The spindle is splined to a sleeve 130 to which its driving gear is fastened.

The forked forward end of the arm 123 which reciprocates the spindle 121 in its bearings acts upon rollers 131 which are carried by a cup-shaped cam 132. This cam (Fig. 17) is normally held up against a collar 133 fast to the spindle by means of the upward pressure of the rollers 134 on bell cranks 119 under the action of spring 122.

When the arm 123 is rocked downwardly, the spindle 121 moves down with the arm while being rotated by the spline connection with gear bearing sleeve 130 until stopped by a collar 135 at its upper end coming into engagement with the supporting casting 136. The arm 123, however, continues to move downwardly causing the cam 132 to shift downwardly with reference to the spindle and thus close the jaw-shaped twisting members 118 against the neck of the bag as illustrated by Figure 18. The neck of the bag is firmly gripped by these jaws and twisted a number of times before the operating arm 123 moves upwardly, first releasing the jaws by lifting cam 132 and then engaging collar 133 and lifting the spindle and twisting mechanism carried thereby.

The twisting mechanism rotates in the direction indicated by the arrows in Figure 18 and the uppermost leaves 118' of the twisting jaws are curved or warped, as indicated in Figure 20. This warping of the uppermost jaw serves to eliminate possibility of shearing the paper.

After the neck of a bag has been twisted, the bag-receiving pockets and the belt 110 shift the bag along into coaction with tape-applying means (Figs. 21 to 24). The tape is applied to the neck of a bag in order to seal the bag and retain the neck in twisted condition.

The tape-applying mechanism is designed to make use of two rolls of tape. This tape is adhesive on one side only. The free ends of the rolls of tape are caused to meet and have their adhesive sides pressed together for about one-half inch. The twisted neck of a filled bag engages the tape where the ends are pressed together. Then the tape is pressed around the neck of the bag from opposite sides and together at the rear of the neck where it is sheared and remains stuck together ready for receiving the neck of the next bag delivered by the conveyor.

This taping mechanism is illustrated by Figures 21 to 24 inclusive and the operating means therefor is illustrated by Figures 15 and 16 and by Figure 1.

In Figure 15 two supply rolls of tape 137 are shown supported on plates 138 mounted on oscillating arms 139. These arms are oscillated by means of a link connection 140 with a cam 141. The cam has a pivotal connection with the link and serves as a crank.

The purpose of so mounting rolls of adhesive tape is to effect forward motion thereof and put slack in the tape at the time that the meeting ends of the tape are engaged by the twisted neck of a filled bag as it moves toward the tape-applying mechanism illustrated by Figures 21 to 24. When this mechanism grips the tape at the point of application to the bag, the supply rolls 137 are shifted rearwardly, thus unwinding sufficiently for the next taping operation. The shaft 142 which carries cam 141 is driven by a sprocket connection with the drive chain 95.

The cam 141 also operates upon a roller 143 carried by an arm 144 which is pivoted between its ends at 145. At its forward end it is linked at 146 to a cam 147. This cam has an inclined surface 148 for successively engaging rollers 149 and 150 (Fig. 21) on pinching slides 151 and 152.

The slide 151 has the function of pressing together the severed ends of the tape and holding them together while the neck, indicated at 153 (Fig. 22), of a forwardly moving filled bag comes to the position shown in this figure.

As the bag continues to move forward, cam 147 permits slide 151 to move toward the left (Fig. 21) under the action of its restoring spring. Slide 152 also is in its left position at this time. Thus an opening is left for the bag to be carried as far as the position illustrated by Figure 23 where the bag is at rest momentarily while cam 147 moves the slides 151 and 152 in succession toward the right, where both of the slides press against the portion of the tape for a short distance at the side of the bag neck.

Figure 21:
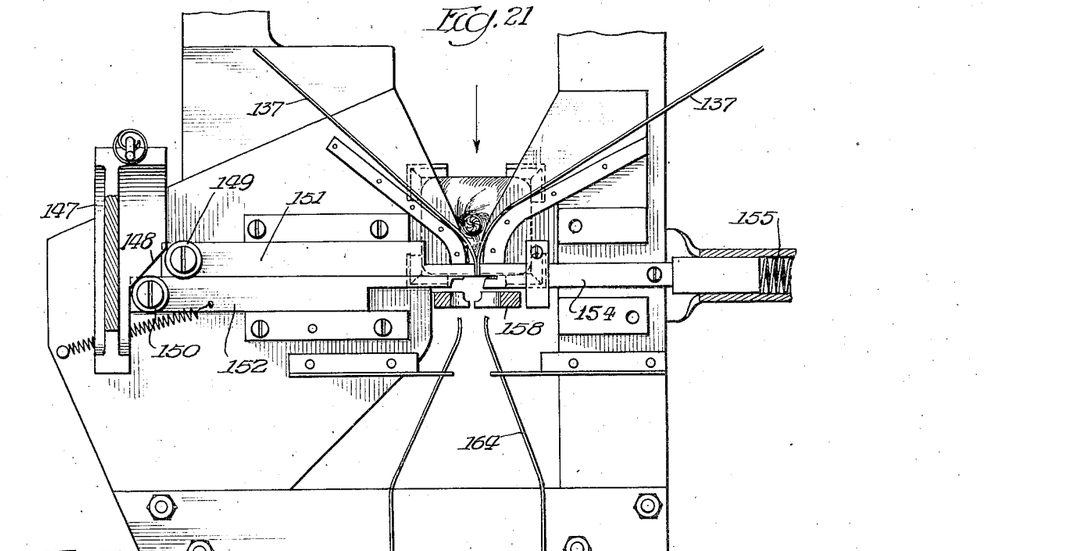
Fig. 21 is a detail in plan and partly in section for illustrating the manner in which adhesive tape is applied to the twisted ends of the bags for sealing and retaining closed the twisted ends of the bags.
Figure 22:
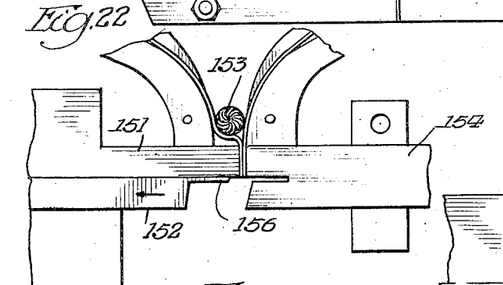
Figs. 22, 23 and 24 are plan details for showing successive positions of the tape applying mechanism.

An abutment for the tape to rest against at this time is provided by the stop member 154. This stop member is substantially stationary but is cushioned slightly by spring 155 (Fig. 21).

Figure 23:
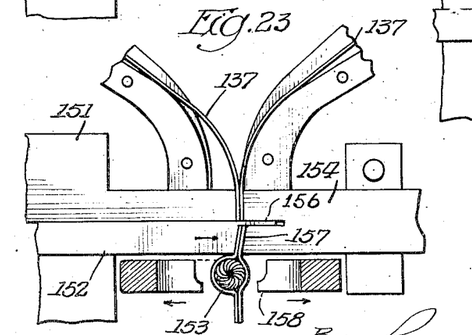

The slide 152 carries a shearing knife 156 that cuts the tape, as indicated in Figure 23, while the tape is gripped between the slide 151 and the stop 154 and the cut ends thereof are thus stuck together. Continued motion of the slide 152 to the right (Fig. 23) presses together ends 157 of the severed portions of tape which encircle the bag neck.

As each bag neck is passed into position to be taped, it comes to rest in jaws 158 which are held together at such time by a cam 159 (Fig. 16). The jaws 158 are lever arms pivoted at 160 and held against the cam by a spring 161 which connects these levers above their pivots 160. Cam 159 is rocked by lever connection 162 (Fig. 15) between it and cam 163 fast to shaft 142.

Figure 24:
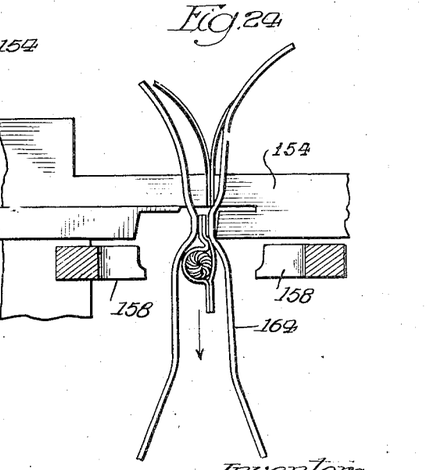

Means such as the wire springs 164, bent as indicated in Figure 24, aid in centering the bag necks with reference to the laterally oscillating jaws 158.

In the operation of this machine the paper from which the bags are formed is taken from either the supply roll 20 or the supply roll 21 or both. When taken from both, bags of double thickness are formed. Paper is drawn from these supply rolls by means of the feed rollers 24—25 and 26—27. These feed rollers are intermittently rotated by the ratchet mechanism 28—29 (Fig. 1) which receives intermittent motion from the continuously driven vertical shaft 35.

Figure 2:
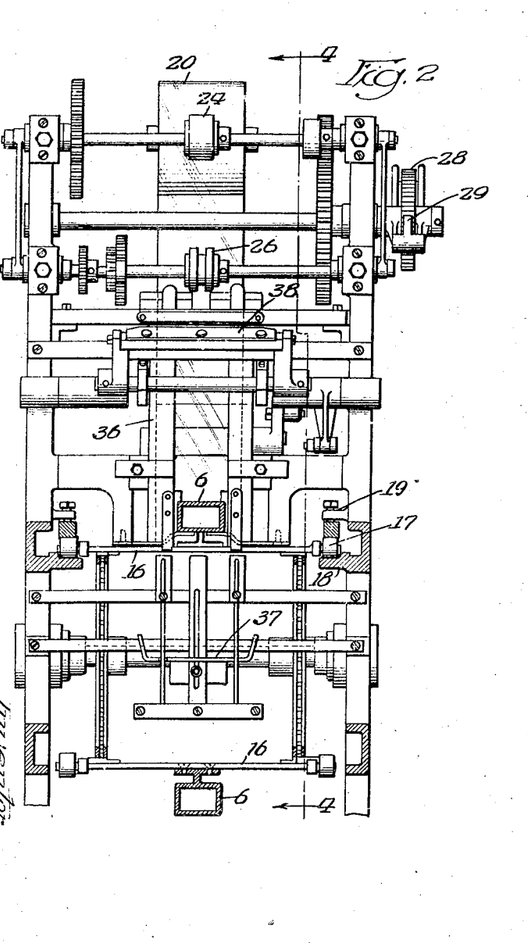
Fig. 2 is a transverse sectional elevation taken on the line 2—2 of Fig. 1.

When a sufficient amount of paper for forming a bag is thus forwarded by the feed rollers, this portion of the paper is severed from the supply strip by means of knife 38. The cut portion of paper slides down the channel ways 36 until its lower edge rests upon gauge 37 (Fig. 2). It is then in position to be engaged by one of the hollow dies 6 which, in moving forwardly, engages the cut portion of paper centrally. Part of the paper is folded down over the top of the die by passing beneath the fixed folding element 46. The bottom part of the paper is folded upwardly against the bottom surface of the die by engagement with the fixed folding elements 47 (Fig. 8).

The paper still projects beyond the die sidewise thereof as illustrated by Figure 9 but folds of the paper along the sides of the die are made in succession by the side folding elements 50, 53 and 54. The folding elements 50 and 53 are best shown by Figure 9 and the folding element 54 by Figure 10.

Prior to making the fold 49 (Fig. 9), spots of adhesive 55 are applied to the cut portion of paper 45 when still in unfolded condition, as illustrated in Figure 7. Then when the part of the paper indicated by numeral 51 in this figure is folded upwardly, one of these spots of adhesive becomes effective for retaining it against the fold 49. The other spot becomes effective in the same manner when the upper section of paper 52 is folded downwardly, but before being thus folded downwardly, a line of adhesive is applied to its under side along its length, so when this part of the paper is folded down over the part 51 it will be sealed thereto.

Figure 10A:
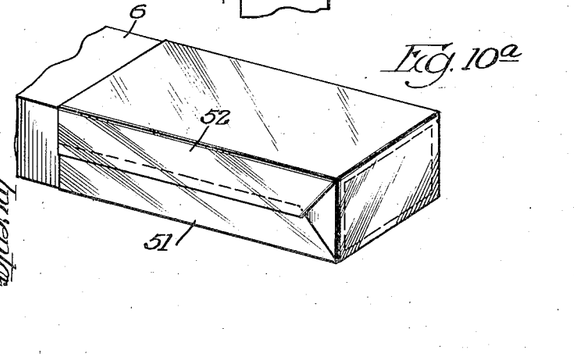
Fig. 10a is a perspective view showing a bag folded around a form.

The adhesive is dried after the folding operation by the application of the electric heating irons 75, shown in Figures 10 and 11. The completed bag, still on the die, is illustrated by Figure 10a.

The next operation is that of filling. The material to be packaged is supplied through hopper 84, Figure 1. A quantity of such material, such as is required for filling one bag, is removed from the hopper by the rotating device shown in detail in Figure 25 and is dropped into the laterally reciprocating chute 96 (Fig. 6) when the latter is beneath the conduit 99 located between the chute 96 and the measuring device.

The chute 96 is moved into position over a die 6 when the latter is rocked to a vertical position at the right end of its carrying conveyor 5 (Fig. 1).

The charge of material for filling a bag drops from the chute 96 through the open end of the die (Fig. 6). Then, due to the weight of the material on the bottom of the bag 83 carried by the die and due to the action of stripping rollers 108, a filled bag is removed downwardly from the die and comes to rest on the upper surface of belt 110 and between the flanges 114 carried by the chains 115.

The belt and chains are intermittently driven and serve to carry the filled bags to the bag-neck-twisting mechanism and to the tape-applying means.

When a bag comes to rest beneath the bag-neck-twisting mechanism, as illustrated by Figure 17, spindle 121 is lowered and it allows the twisting elements 118 to encircle the neck of the bag. When the spindle reaches its lowermost position, the bell cranks 119, which carry the twisting elements, are rocked around their pivotal supports on the spindle by downward pressure from cam 132. Thus the twisting elements close against the neck of the bag, crimping the latter to a small diameter, while rotating with the spindle and applying several twists.

When this work is accomplished, cam 132 is lifted and the twisting jaws open under the action of spring 122. The twisting mechanism is then lifted clear of the bag and the latter moves forward until its supporting conveyor stops and the bag comes to rest with its neck engaging the stops 158 (Fig. 21).

In moving to this position, the adhesive tape 137 is engaged by the bag where the two meeting ends of the tape are stuck together and a portion of the tape is thus carried beyond the tape pressing elements 151 and 152. These pressing elements then engage the tape in succession, squeezing small portions thereof together, as illustrated by Figure 23, and also cutting the tape by means of knife 156.

While the pressing element 151 is still in engagement with the coacting element 154 and the cut ends of the tape firmly held thereby, the tape is partly unrolled from the supply rolls thereof, carried by the supports 138, by shifting these supports rearwardly. Then the supports move forward, allowing slack to occur in the tape. As the slide 151 (Fig. 22) moves away from the stop 154, the tape will be engaged by the neck of the next bag and carried into position for action thereon by the tape pressing and severing members.

Although but one specific embodiment of this invention is herein shown and described, it is to be understood that some of the details as set forth may be altered or omitted from the spirit of the invention as defined by the following claims.

We claim:

1. In a machine of the class described, mechanism for twisting the necks of filled paper bags comprising coacting sets of V-shaped laminated jaws interleaved with each other, and means for causing said jaws to embrace the neck of a bag, move toward each other and to rotate.

2. In a machine of the class described, mechanism for twisting the necks of filled paper bags comprising coacting sets of V-shaped laminated jaws interleaved with each other, means for causing said jaws to embrace the neck of a bag, move toward each other and to rotate, the laminations of said jaws interfitting in sliding relation and being straight except that an upper lamination is warped.

3. A machine of the class described, comprising a driven belt carrying a series of tubular open-ended bag-holding forms and adapted to cause the forms to travel intermittently and to successively carry said forms to a vertical position; a bag filling mechanism adapted to place a charge of filling material in the upper end of a form when the form is in vertical position, a conveyer below said bag-filling mechanism for receiving bags with the filling material therein from the bottom of the form, bag-neck-twisting mechanism arranged to pass downwardly over the open end of the bag after delivery by the die and comprising interleaved opposed laminated jaws, and means for applying adhesive tape to the twisted neck of a bag for sealing the bag.

4. A machine of the class described comprising a driven belt carrying a series of open-ended tubular bag-holding forms and adapted to cause the forms to travel intermittently in a horizontal direction and to successively carry each form around to a vertical position, means for applying bags to said forms, a bag filling mechanism adapted to place a charge of filling material in the opposite open end of a form when the form is in vertical position, means for receiving a bag with the filling material therein from the bottom of the form when the form is in a vertical position, bag-neck-twisting mechanism arranged to pass downwardly over the open end of the bag after delivery by the form and comprising interfitting laminated jaws, and means for applying adhesive tape to the twisted neck of a bag for sealing the bag, said tape applying means being arranged to wrap tape around the neck of a bag and pinch the tape together at one side of the neck of the bag and sever the tape substantially midway of the pinched portion thereof.

5. In a machine of the class described means for applying adhesive tape to the twisted necks of filled bags comprising a pair of spaced apart supports for supply rolls of adhesive tape, means for guiding tape from each supply roll to a meeting point for the ends of the tape, mechanism at this point for receiving the neck of a filled bag and wrapping tape around the neck of the bag and pressing portions of tape together and severing the tape midway of the pressed together portions thereof.

EMIL G. JURGENS.
HAZEN K. BECKER.